United States Patent [19]

Janner et al.

[11] 4,431,136
[45] Feb. 14, 1984

[54] SLIT NOZZLE AND FAST-ACTING SHUTOFF VALVE

[75] Inventors: Karl Janner, Erlangen; Klaus Gregorius, Neunkirchen, both of Fed. Rep. of Germany

[73] Assignee: Kraftwerk Union Aktiengesellschaft, Mülheim, Fed. Rep. of Germany

[21] Appl. No.: 242,920

[22] Filed: Mar. 12, 1981

[30] Foreign Application Priority Data

Mar. 17, 1980 [DE] Fed. Rep. of Germany ....... 3010178

[51] Int. Cl.³ ............................................. B01D 59/00
[52] U.S. Cl. .................................. 239/102; 251/129; 422/186
[58] Field of Search .......... 55/17; 239/102, 99, 239/537, 541, 455; 415/181; 251/129; 422/186

[56] References Cited

U.S. PATENT DOCUMENTS 3,055,631  9/1962  Kippenhan .................... 251/129
4,206,876  6/1980  Koch ............................. 239/455
4,334,883  6/1982  Robinson et al. ............. 423/258

FOREIGN PATENT DOCUMENTS 2810791  9/1979  Fed. Rep. of Germany .......... 55/17

OTHER PUBLICATIONS

Publication "Folded Optical Delay Lines", Donald R. Herriot and Harry J. Schulte, Aug. 1965, vol. 4, No. 8, Applied Optics, pp. 883 to 889.

Primary Examiner—Deborah L. Kyle
Attorney, Agent, or Firm—Herbert L. Lerner; Laurence A. Greenberg

[57] ABSTRACT

Slit nozzle and fast-acting shutoff valve for producing very brief gas flows accurately reproducible with respect to pulse width and spacing such as are required with pulse laser excitation for separation processes and photochemical processes including a first and a second nozzle part defining a nozzle slit therebetween, the first and the second nozzle parts forming the slit nozzle and, simultaneously, the fast-acting shutoff valve, at least one of the nozzle parts being rapidly movable for varying the width of the nozzle slit practically between zero and a nominal size.

4 Claims, 6 Drawing Figures

SLIT NOZZLE AND FAST-ACTING SHUTOFF VALVE

The invention relates to a slit nozzle and fast-acting shutoff valve for generating very brief gas flows which are exactly reproducible with respect to pulse duration and spacing, such as are required for the excitation with pulse lasers for separating processes and photochemical processes. For purposes of uranium enrichment and other photochemical processes, a multiplicity of processes have already been proposed heretofore wherein the mixture of substances to be irradiated flows from a slit-shaped nozzle and is subsequently exposed, in the direction of the nozzle slit, to laser radiation of a given frequency. At present, however, continuously operating lasers of sufficient output are not available but only pulse lasers. This means that only a very small quantity of the gas jet leaving the nozzle can be excited. Because the pulse repetition frequency of such laser equipment is also too small for total irradiation of the continuous gas jet, it has been proposed heretofore (see German Published Non-Prosecuted Application (DE-OS No.) 28 10 791) to control the gas jet pulsewise by means of a fast-acting shutoff valve preceding the nozzle. Even if several sequentially fired laser devices are used, the opening time of such fast-acting shutoff valve is yet very short, so that the manufacture thereof is accompanied by very great mechanical difficulties. In these heretofore known constructions according to the state of the art, it is necessary to make the dead space between the valve proper and the nozzle as small as ever possible, but there are mechanical limits for meeting this requirement.

It is accordingly an object of the invention to provide a slit nozzle and fast-acting shutoff valve which not only solves the problem of the dead space between the slit nozzle and the valve but also ensures the possibility of perfect adjustment of the required opening and closing times and therewith guarantees proper synchronization with the laser equipment and its technical potentials.

With the foregoing and other objects in view, there is provided, in accordance with the invention, a slit nozzle which is itself formed as a fast-acting shutoff valve, the width of the nozzle slot being variable practically between zero and the nominal size thereof by a fast motion of one or both parts of the nozzle.

In accordance with another feature of the invention, for the closing and opening motion of the two slit nozzle parts, a simultaneously acting positioning element is provided, respectively, above and below the slit nozzle parts.

In accordance with a further feature of the invention, the adjusting elements are piezoelectrically acting elements as well as mounting means for the nozzle parts themselves having an elastic-restoring force.

In accordance with an additional feature of the invention, the adjusting elements are magnetostrictively operating elements as well as mounting means for the nozzle parts themselves having an elastic deformation.

In accordance with an added feature of the invention, there is provided a gas chamber disposed upstream of an inlet to the nozzle slit in flow direction of gas through the nozzle, the adjusting elements being located in the gas chamber and having a positive locking connection with the elastic mounting means for the nozzle parts.

In accordance with yet another feature of the invention, there is provided, in combination with a laser device and optical delay lines, very brief gas flows developed by the slit nozzle and fast-acting shutoff valve being traversible by laser radiation from the device for isotope-selective separation, the gas flows being traversible several times in succession under the intermediary of the optical delay lines.

In accordance with a concomitant feature of the invention, a component of the gas in the flows is $UF_6$.

Other features which are considered as characteristic for the invention are set forth in the appended claims.

Although the invention is illustrated and described herein as embodied in a slit nozzle and fast-acting shutoff valve, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which.

Since the pulses of the gas leaving the nozzle, which is expanded therein in a conventional manner, for example adiabatically, and is thereby undercooled, are very short, for example $10^{-5}$ sec, the system valve/nozzle must have very high resonance frequencies and a very small dead volume. Both requirements are met by the fact that the nozzle lips themselves i.e. the upper part and the lower part of the slit nozzle, assume the shutoff function. The dead space is thereby completely avoided and the high resonance frequency is achieved by using moving elements with a high resonance frequency.

Because the pulse width of a laser is in the order of magnitude of a microsecond or less, it is advisable, however, to prolong the radiation time by letting this laser pulse traverse the gas beam several times and thereby simultaneously improve the effect of the irradiation. This purpose is then served by the previously mentioned optical delay line. Such delay lines are already known in the art and the principle of such a line is described by R. H. Herriott and J. J. Schulte in Applied Optics, August 65, Volume 4, Page 883.

Further details of this invention can be seen in FIGS. 1, 2 or 3 to 5 which show embodiment possibilities by way of examples. The last FIG. 6 shows the possible application of this system in conjunction with a laser equipment as well as an optical delay line for extending the effective action of a laser pulse.

Figure 1:
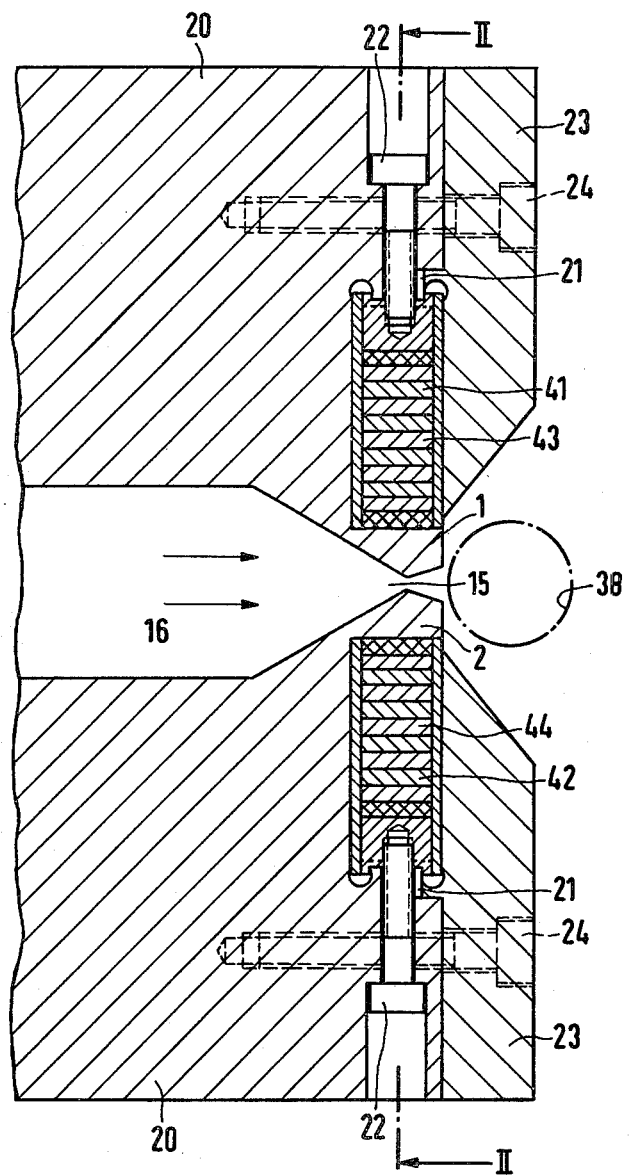
FIG. 1 is a longitudinal sectional view of a slit nozzle and fast-acting shutoff valve in accordance with the invention.

Referring now to the drawing, and first particularly to FIG. 1 thereof, there is shown a feed canal 16 through which the gas to be irradiated is transported to the slit-shaped nozzle 15, the breadth of which may be in the order of magnitude of meters. It is defined by an upper nozzle part 1 and a lower nozzle part 2, which are connected integrally to the nozzle body 20. The width of the nozzle gap is several hundredths of a millimeter. By means of screws 22, piezoelectric control elements 41 and 42 are fastened in the nozzle body 20 between the nozzle parts 1 and 2, respectively, on the one hand, and a respective abutment 21, on the other hand. This purpose is also served by mounting feet or paws 23 which are connected to the nozzle body 20 by screws 24.

Figure 2:
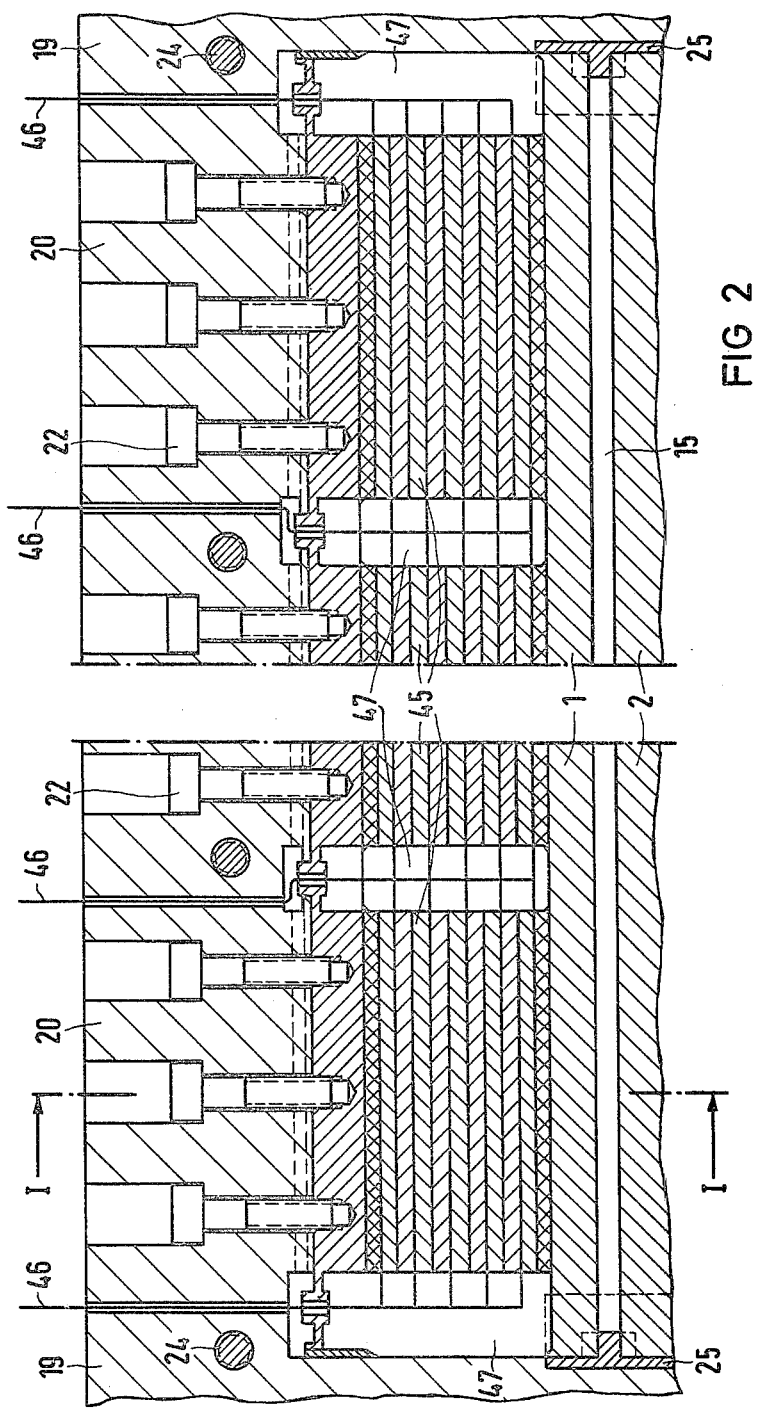
FIG. 2 is a cross-sectional view of FIG. 1 taken along the line II—II.

FIG. 2 is a cross-sectional view taken along the line II—II of FIG. 1, showing the elongated shape or breadth of the nozzle gap 15 as well as the arrangement of the piezoelectric bodies 41. The latter are made up of a number of small plates 43, 44 (FIG. 1) which are provided with metallized surfaces and are connected via a line 46 to a non-illustrated controlled voltage source. If the nozzle slit 15 is very long, several such stacks of individual elongated piezoelectric plates 43 or 44 are arranged. Between these and toward the outer or marginal zones, there are spaces 47 to receive the feed lines 46. The slit nozzle 15 is closed off laterally by plates 19 fastened to the nozzle body, and a permanently elastic sealing body 25 is provided in the region of the upper and the lower part 1 and 2, respectively, of the nozzle.

The manner of operation of this device is that, upon application of a voltage to the piezoelectric plates 43 and 44, the entire stack 45 expands and thereby compresses the nozzle parts 1 and 2 until the nozzle gap 15 is closed. After the voltage is removed, the nozzle parts 1 and 2, which are elastically deformed thereby, spring back and, thereby, again free the path for the gas flow 16. By switching-on the current, the nozzle gap is thus closed in this case and, by shutting off the current, it is opened again. By programming the wave shape of the current rise as well as the expansion data, the motion of the upper and the lower nozzle parts 1 and 2 can be controlled so that a uniform and bounce-free closing of the entire nozzle gap 15 is achieved.

It should additionally be mentioned that the opening and closing times can be shortened further by making the external shape of the piezoplate stack 45 conical. The plates with less width are then always at the moving end which further reduces the mass of the nozzle parts in its entirety including the piezoelectric elements. It is further possible to influence these opening and closing times through mechanical construction of the connection of the upper and lower nozzle parts 1 and 2 to the rest of the nozzle body 20, because in this manner, the modulus of elasticity is also adjustable.

In this embodiment, the variation of the piezoelectric control elements 41 and 42 has a direct influence upon the variation of the nozzle gap of the slit nozzle 15.

Figure 3:
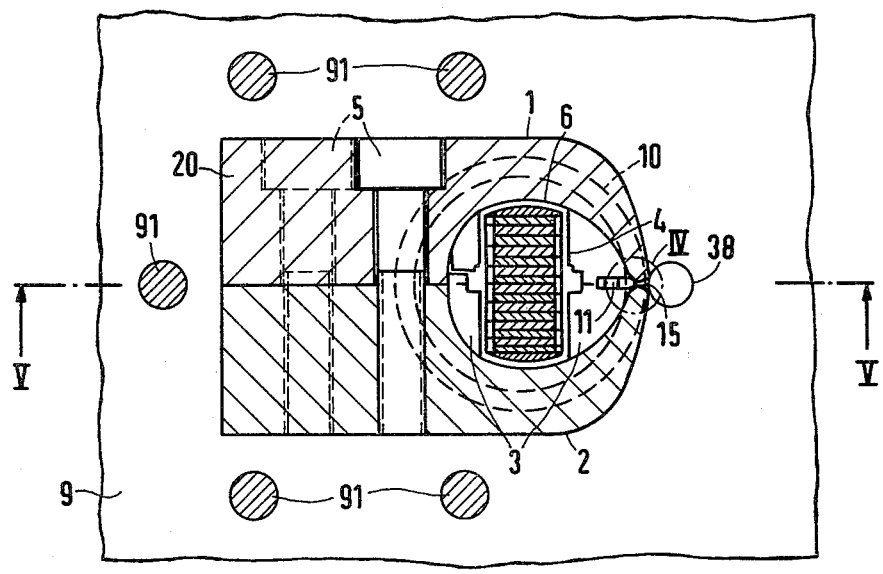
FIG. 3 is a cross sectional view of another embodiment of the invention.
Figure 4:
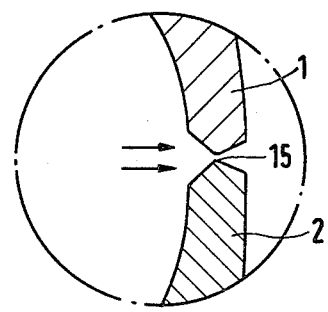
FIG. 4 is an enlarged fragmentary view of FIG. 3.
Figure 5:
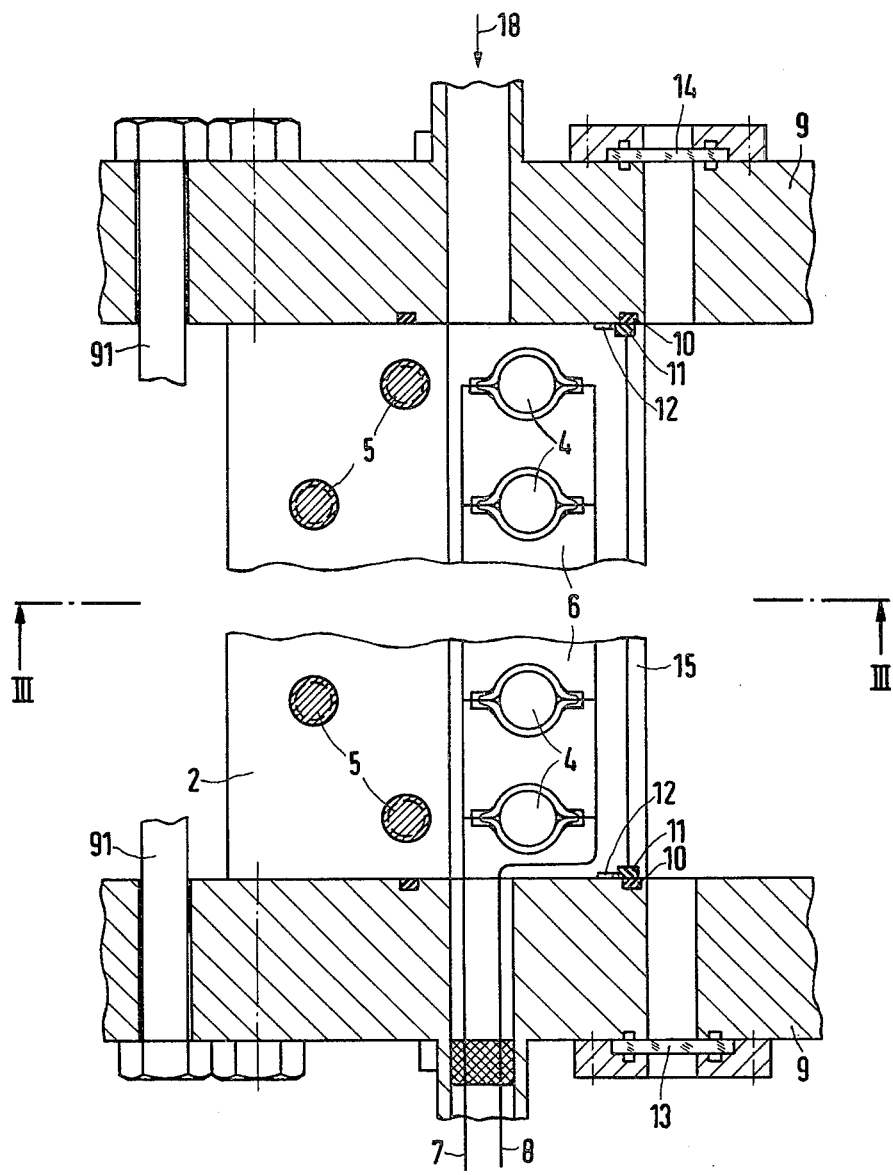
FIG. 5 is a longitudinal sectional view of FIG. 3 taken along the line V—V.
Figure 6:
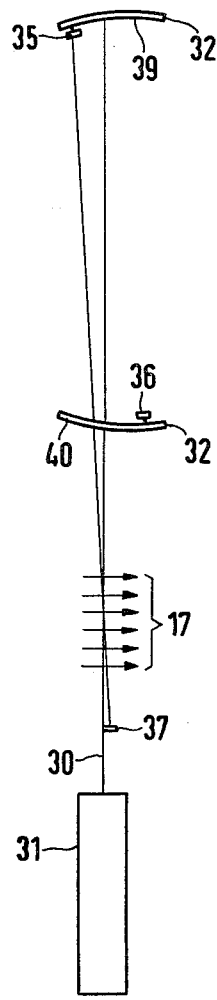
FIG. 6 is a simplified diagrammatic view of the system according to the invention in conjunction with laser equipment as well as an optical delay line for extending the effective action of a laser pulse.

In the next embodiment shown in FIGS. 3, 4 and 5, the piezoelectric control elements 4 are arranged so that any change therein is transmitted to the nozzle gap 15 according to the lever law i.e. a smaller length change of the control elements 4 is sufficient to open or close the slit nozzle. Whereas, in the first embodiment discussed hereinbefore, the application of the voltage to the control elements leads to a closing of the slit nozzle, exactly the reverse is the case in the embodiment described hereinafter.

FIG. 3 is a cross-sectional view and FIG. 5 a longitudinal sectional view of a nozzle, an enlarged fragmentary cross-sectional view of which is illustrated in FIG. 4. The nozzle itself is formed of two nearly symmetrical parts 1 and 2 which close off a distributor space 3 for the gas flowing out through the nozzle. This space 3 contains a number of piezo-control elements 4 which are built up in a conventional manner from circular plates metallized at the end faces thereof. There are provided alternatingly with contacts for the current so that each plate can be connected to a voltage via leads 7 and 8. As shown in FIG. 3, each control element 4 is unsulatedly built into a corrosion-resistant envelope with an electric feedthrough at one-half the height, because this location is not subjected to motion. Several such elements are arranged so that they make pressure contact with the nozzle parts 1 and 2 and are held in the position thereof by a spacer 6 (see FIG. 5). They are electrically insulated, of course, in a suitable manner from the nozzle parts 1 and 2 as well as from the nozzle body 20.

As mentioned hereinbefore, the current is fed to the piezoelectric elements 4 via the leads 7 and 8. If voltage is applied to the latter, these piezoelements 4 expand according to the value of the voltage, and the nozzle parts 1 and 2 are forced apart. With 200 volts and 20 plates of 1 millimeter thickness each, excursions of several hundredths of a millimeter are attainable. Depending upon the position of the piezoelements 4 between the nozzle gap and the clamping of the nozzle parts 1 and 2 in this body 20, the stroke of the elements is transformed according to the lever law. When the voltage is removed, the nozzle return to the original closed position because of the elasticity of the nozzle parts 1 and 2. To laterally seal the nozzle parts 1 and 2, the latter are clamped between the plates 9, which are connected to one another by screws 91. The plates 9 contain a sealing ring 10. An additional sealing member 11 is furthermore provided at the ends of the slit nozzle, and is held in the position thereof by clamps 12.

The plates 9 are part of the wall of a treatment chamber into which the gases expanded in the nozzle 15 flow. For access of the laser radiation to this otherwise non-illustrated housing, windows 13 and 14 are disposed in the lateral plates 9. The laser beam in front of the nozzle 15 then has maximally the cross section represented by the circle 38 in FIG. 3.

Since piezoelectric elements have very brief rise or increase times, very short opening times for the slit nozzle 15 are also possible. Since they also generate relatively large forces, the moment of inertia of the nozzle parts 1 and 2 and, therefore, the restoring force thereof can be made large. If, in addition, as shown in FIG. 3, the mass of the moving parts 1 and 2 is kept small, this also results in correspondingly short closing times.

The characteristic of the piezoelements 4 that they develop the greatest force at the beginning of the movement also has an advantageous effect on short opening times. These times can be shortened further if the length of the piezoelements 4 and the shape of the nozzle parts 1 and 2 are matched to one another in such a manner that the nozzle is closed under pretension. Then, the opening begins only if the moved masses, with the exception of the nozzle lips i.e. the region of the nozzle constriction, have themselves already reached a certain velocity. On closing of the nozzle gap 15, possible deforming shocks are prevented by appropriate electrical voltage control of the piezoelectric elements.

Instead of the piezoelectric control elements used in these embodiments, elements based on magnetostriction can, of course, also be used in an equivalent manner.

This device of a controllable slit nozzle is suitable particularly for application in conventional laser isotope separation. It is of particular interest to perform, in this manner, the enrichment of uranium with its uranium 235 isotope, wherein generally the gaseous compound $UF_6$ is used.

FIG. 6 shows diagrammatically the interrelation and arrangement of the laser beam relative to a gas jet 17 which has left the nozzle 15 and has substantially the cross section 38 (see FIGS. 3 and 1). This laser beam enters and leaves the gas jet 17 via the windows 13 and 14 shown in FIG. 5. In FIG. 6, the laser equipment is identified by reference numeral 31 and the laser beam leaving the latter by reference numeral 30. The laser beam 30 penetrates the gas jet 17, over the entire width thereof and arrives at the delay line 32. The latter is formed of two nearly confocal mirrors 39 and 40, between which the beam is reflected back and forth several times outside the axis. After the desired delay time, this beam then strikes the auxiliary mirror 36, is reflected by the latter to the auxiliary mirror 35 and by the latter again through the gas jet 17 to the auxiliary mirror 37. The beam reflected by the mirror 37 follows a different path than the incoming path thereof.

If the laser pulse width is equal to the delay time, then the irradiation time for uninterrupted irradiation is increased multiplicatively by the number of passages. If the pulse width is shorter, gaps in time are produced with a corresponding extension of the overall duration. If the laser pulse width is longer than the delay time, then the pulses overlap and the power density is higher during the overlap time. All three cases are of practical interest and can be realized by suitable adjustment of the control elements 4, 41 and 42 as well as of the delay line in conjunction with the laser equipment. Thus, the first and second case i.e. the pulse width is equal to or greater than the delay time, can be of interest for processes with a relatively long life of the excited states, for example, for selective condensation (German Published Non-Prosecuted Application (DE-OS No.) 28 49 162). The last-mentioned case, where the pulse width is shorter than the delay time, can be used in processes, for example, for which time-shaping of the laser pulse is of advantage such as, for example, in multistage excitation.

The residual energy contained in the laser beam can be returned to the laser by a conventional type of beam arrangement or can also be fed to a second laser to trigger thereby a further light pulse.

There is claimed:

1. A slit nozzle having a controllable fast-acting shut-off valve for producing pulse-like gas flows for selectively exciting gaseous mixtures with pulse-like laser radiation, the nozzle being formed of a nozzle body having an upper and a lower nozzle part defining a nozzle slit therebetween having an opening for a gas flow openable and closable in pulse-like manner, comprising means for mounting the nozzle parts, and at least one adjusting element for moving the nozzle parts relative to one another in a direction opposing an elastic restoring force of said mounting means and varying the width of said nozzle slit between zero and a nominal size, the upper nozzle part having a space thereabove, and the lower nozzle part having a space therebelow, said adjusting element being disposed in one of said spaces.

2. A slit nozzle according to claim 1 wherein said at least one adjusting element comprises a piezoelectric control element.

3. A slit nozzle according to claim 1 wherein said at least one adjusting element comprises a magnetostrictive control element.

4. A slit nozzle according to claim 1 wherein said one adjusting element is located in said space above the upper nozzle, and another adjusting element is located in said space below the lower nozzle.

* * * * *